June 18, 1957 W. STELZER 2,796,154
BOOSTER BRAKE MECHANISM
Filed Aug. 21, 1953
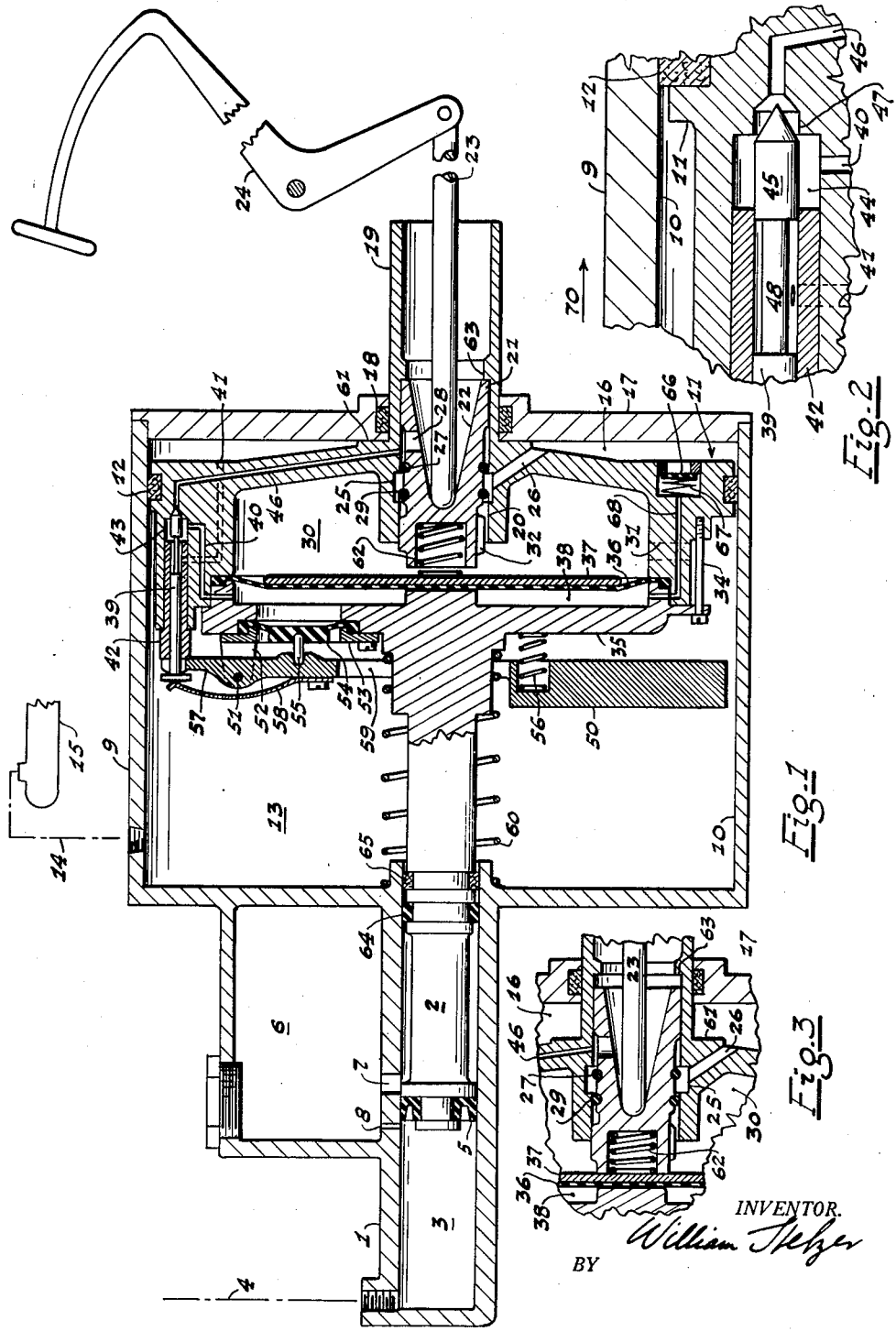
INVENTOR.
William Stelzer
BY United States Patent Office 2,796,154
Patented June 18, 1957

2,796,154

BOOSTER BRAKE MECHANISM

William Stelzer, Summit, N. J.

Application August 21, 1953, Serial No. 375,735

9 Claims. (Cl. 188—152)

The invention relates to a booster brake mechanism for motor vehicles, and more particularly to a booster brake mechanism including a control device responsive to the deceleration of the vehicle for governing the pedal reaction.

It is well known that brakes are most effective at low car speeds, so that to produce a given deceleration of the vehicle a lower pedal pressure or less effort is required than at higher speeds. The result is that passengers are often violently pitched forward when seemingly normal brake applications are made at speeds below 20 M. P. H., thus adversely affecting car safety.

The object of this invention is to prevent unintended severe brake applications and to thereby increase the safety of automotive travel.

While the present invention does not aim to produce a braking system where the manual effort is exactly proportional to the deceleration of the vehicle, it is nevertheless intended to approach that aim by keeping the pedal pressure proportional to the deceleration of the vehicle at lower car speeds or whenever a predetermined ratio of deceleration versus pedal pressure is exceeded.

Another object is to provide means applicable to power brakes where a force generated by the deceleration of the vehicle is amplified to react on the brake pedal, giving the operator a "pedal feel" of the deceleration of the vehicle, or where a force generated by the deceleration of the vehicle is applied to govern the conventional reaction means of the power brakes.

All booster brake mechanisms or lately called power brakes in use today comprise certain means to react on the brake pedal so that the pedal pressure is proportional to the effort required to apply the brakes. The reaction can be produced directly by the hydraulic pressure transmitted to the wheel cylinders, or by the boosting force applied to the power brake by the source of power, the latter being usually fluid under pressure, the fluid being liquid or compressible. My invention can be applied to the different constructions as long as there is a source of power. In applying my invention to any of the various constructions, a weight movable in the direction of travel of the vehicle controls a valve to urge to increase the reaction on the brake pedal, and an element responsive to the force of reaction opposes the action of the weight.

Other objects and advantages of this invention will be apparent from the following description considered in connection with the accompanying drawing submitted for the purpose of illustration and not to define the scope of the invention, reference being had for that purpose to the subjoined claims. In the drawing, wherein similar reference characters refer to similar parts throughout the several views:

Fig. 1 is a longitudinal sectional elevation of a master cylinder type booster brake mechanism embodying my invention, the construction being shown diagrammatically;

Fig. 2, an enlarged fragmentary sectional view of a portion of the construction, showing the reaction controlling valve in a position where the force of reaction is increased; and Fig. 3, a fragmentary sectional view as in Fig. 1, but where the follow-up valve for controlling the power of the booster brake mechanism is in a position where full power is applied.

Before explaining the present invention in detail it is to be understood that the invention is not limited in its application to the details of construction and arrangement of elements illustrated in the accompanying drawing, since the invention is capable of other embodiments and of being practised or carried out in various ways. Also it is to be understood that the phraseology or terminology employed herein is for the purpose of description and not limitation.

Referring now to the drawing, the invention is embodied in a booster brake mechanism comprising a master cylinder 1 in which slides a piston 2 to transmit brake fluid from chamber 3 to the wheel cylinders through line 4. The latter may include a conventional residual valve, not shown. Piston 2 carries a sealing cup 5 having a flexible outer lip to permit the flow of liquid from a reservoir 6 (through a hole 7) into chamber 3 if a suction exists in the latter. A port 8 represents the conventional means for establishing communication between the reservoir and chamber 3 or the wheel cylinders in the released position.

Cylinder 1 joins a concentric housing 9 of a motor mechanism having a bore 10 in which slides a piston indicated in its entirety by numeral 11 and having a seal or packing 12 to divide the space within housing 9 into chamber 13 connected through line 14 to a source of vacuum or low pressure 15, and chamber 16 in which the pressure is variable in accordance with the operation of the booster. Thus piston 11 is operated by differential pressure, the source of power being fluid under pressure, which in the embodiment shown is air from the atmosphere, and the lower pressure level being provided by the source of vacuum 15. Chamber 16 is closed off by a cover 17 secured to housing 9 and having at its hub a bearing and seal 18 through which slides a hollow shaft 19 extending from piston 11. A bore 20 in shaft 19 and piston 11 carries a slidable valve plunger 21 having a socket 22 engaged by a push rod 23 operably connected with a manually operated brake pedal 24. An internal groove 25 communicates with chamber 16 through a passage 26. An O-ring 27 controls the flow of air to chamber 16 from the atmosphere, a hole 28 being provided in plunger 21 to admit air to the space to the right of O-ring 27. Another O-ring 29 carried by plunger 21 controls the flow of air from chamber 16 to chamber 30 which is open to vacuum chamber 13 through passage 31. The bearing portion at the left hand end of plunger 21 has several longitudinal grooves such as groove 32 to facilitate the flow of air just described.

Piston 11 is secured, as at 34, to a flange 35 at the end of piston 2, a diaphragm 36 molded to a plate 37 being clamped between flange 35 and piston 11 to form a chamber 38 subject to variable air pressure controlled by a reaction control valve comprising a valve plunger 39 but ordinarily in communication with chamber 16 through passages 40 and 41. This valve plunger 39 slides in a sleeve 42 pressed into a bore 43 of piston 11, the bore being deeper than the sleeve to leave a valve chamber 44 (see Fig. 2) of a length slightly shorter than the cylindrical portion of head 45 of valve plunger 39 so that in the lap position chamber 44 is shut off from passage 41 as well as from passage 46 which leads to the atmosphere via hole 28, since head 45 has entered into bore 47. Further movement towards the right seats the pointed end of head 45 on the seat at the entrance of passage 46, when the left end of head 45 has left the bore of sleeve 42 to establish communication between chamber 44 and passage 41 or chamber 16 via the space around stem 48 of plunger 39. The reaction control valve is operated by a weight or pendulum 50 pivotally supported at 51 by a bracket 52 extending from a cover 53 with which the outer bead of a diaphragm 54 is clamped down, the latter being linked by a pin 55 to weight 50 so that pressure in chamber 38 acting on the diaphragm or pressure sensitive element 54 urges weight 50 toward the left or aft with respect to the vehicle, helped by a very light spring 56 so that the weight is at rest as shown in Fig. 1 and the forked end of upper lever 57 straddling plunger 39 rests against the shoulder of sleeve 42, whereby a leaf spring 58 secured to weight 50 urges plunger 39 toward the right where the atmosphere is shut off and chamber 38 is in communication with chamber 16. Weight 50 has a large opening 59 to accommodate piston 2 and a return spring 60 which urges the coaxial piston units towards the right or the released position where shoulder 61 of piston 11 rests against end plate 17. In this released position diaphragm 36 of the reaction device is pressed against the central portion or pad of flange 35 by a spring 62 reacting against valve plunger 21 which is urged to rest against stop 63 of sleeve 19. To seal the master cylinder against the motor mechanism a pair of conventional seals 64 and 65 are mounted in grooves in piston 2. In order to assure that the pressure in chamber 38 is never lower than in chamber 16, a check valve 66 tended by a very light spring 67 is provided. This check valve may be located at a higher elevation than shown. It allows flow of air from chamber 16 to chamber 38 through passage 68 but not vice versa. This check valve remains closed throughout the operation of the booster and would only open in case of failure of the reaction control mechanism.

*Operation*

Arrow 70 indicates the direction of travel of the vehicle, the axis of the booster pointing fore and aft. In the released position, as shown in Fig. 1, while the vacuum pressure from source 15 is communicated to chambers 13 and 30, the same vacuum pressure exists in chambers 16 and 38. Depression of the brake pedal and consequent movement of valve plunger 21 to the left against spring 62 first seals O-ring 29 and then unseats O-ring 27 to admit air from the atmosphere via hole 26 into chamber 16 to move pistons 11 and 2 to the left, the latter displacing fluid from chamber 3 to the wheel cylinders. At the same time the pressure in chamber 16 is communicated to chamber 38 as the reaction control valve is in the position shown in Fig. 1. In the initial movement the resistance to the movement of piston 2 is light so that piston 11 moves with a very low pressure in chamber 16 until the brakes take a set. Diaphragm 36 rests against the central portion of flange 35 until the pressure in chamber 38 is sufficient to overpower spring 62, after which plate 37 moves into contact with plunger 21. Since the force of spring 62 is in series with the force exerted by manual power on rod 23 and the force in chamber 38 reacting against rod 23, spring 62 does not affect the booster ratio after plate 37 touches plunger 21, the booster ratio remaining constant until maximum power is reached when atmospheric pressure exists in chamber 16. Thus this arrangement of spring 62 affords a very soft pedal for light brake applications. So far the description of the operation has been that of a conventional master cylinder booster except for the function of spring 62 which is novel. At high speeds or for light brake applications the operation remains as described. Assuming now that the vehicle is traveling at low speed where the brakes are more effective, or where the coefficient of friction of the brake lining is greater, and that the pedal is being depressed with a sufficient force to produce a deceleration out of proportion with the manual effort or pedal pressure, then the inertia force due to the mass of weight 50 causes the latter to swing forwardly towards plate 35, overcoming spring 56 and the opposing pressure acting on diaphragm 54 in chamber 38. The movement of the weight causes lifting of valve plunger 39 to close passage 41 and open passage 46 as shown in Fig. 2 so that air is admitted through passages 46 and 40 to chamber 38 of the reaction device, causing the reaction exerted by diaphragm 36 against rod 23 to be increased so that there is a tendency to yield plunger 21 to decrease the pressure in chamber 16 through the action of valve rings 27 and 29, thereby reducing the brake application by reducing the hydraulic pressure generated in chamber 3. At the same time the higher pressure in chamber 38 increases the force on diaphragm 54 so that the latter moves the weight a sufficient distance to the left to put the head of valve plunger 39 in lap position where the supply of air from passage 46 is shut off so that the pressure in chamber 38 is not further increased. If the operator desires a stronger braking effect he must press harder on the pedal to increase the pressure in chamber 16 by pushing valve plunger 21 towards a position shown in Fig. 3. The resultant increased deceleration of the vehicle affects weight 50 to further increase the reaction pressure in chamber 38 in the manner described. It follows that in a range of speed where the brakes are most effective or under conditions, such as humidity, where the coefficient of friction of the brake lining is increased, the reaction force opposing the manual application of the brake pedal is governed or controlled by the deceleration of the vehicle. When the deceleration decreases, the pressure in chamber 38 is gradually relieved through passages 40 and 41 into chamber 16 since weight 50 yields to spring 56 and diaphragm 54 and thereby moves valve plunger 39 to the right.

The retractile movement or release of the brakes is effected by release of the brake pedal so that valve plunger 21 opens chamber 16 to vacuum chambers 30 and 13, the pressure in chamber 38 being reduced simultaneously because plunger 39 is in the position shown in Fig. 1.

It might be feared that weight 50 would have a tendency to swing under traveling conditions, causing unnecessary operation of valve 39. Aside from the fact that there is practically no "bouncing" of an automotive vehicle in a fore and aft direction, there being only gradual acceleration or deceleration, any undesired oscillation or swing of weight 50 is prevented by spring 56 urging arm 50 to rest against sleeve 42. This spring also opposes weight 50 when the vehicle is travelling down hill. A damping effect is obtained by weight 50 extending into the lubricating oil in chamber 13, such lubricating oil being generally used in piston type motor mechanisms.

While the invention is here embodied in a booster of the master cylinder type, where the motor mechanism is "vacuum suspended," it is apparent that the force from pedal 24 instead of through rod 23 may be transmitted hydraulically by means well known in the art, such as means 34, 76, and 77 shown in Patent 2,260,491, and this does not in any way change the reaction controlling device illustrated in the drawing. Thus pedal 24 and rod 23 or other hydraulic force transmitting means may be termed "manually operated means."

Having thus described my invention, I claim:

1. In a motor vehicle power brake system having a booster of the class described and controlled by manually operated means, a source of fluid under pressure serving as a source of power for said booster, a differential fluid pressure operated reaction device operatively connected to oppose said manually operated means, valve means having fluid transmitting means connected to direct fluid under pressure from said source to and from said reaction device, a forwardly movable weight responsive to the deceleration of the vehicle, said weight being operatively connected with said valve means to actuate the latter to direct fluid under pressure to and from said reaction device to increase the force of said reaction device in response to an increase in deceleration and to decrease said force with a decrease in deceleration, and a pressure sensitive element responsive to the differential fluid pressure of said reaction device operatively connected to said weight to oppose the forward movement of said weight.

2. The construction claimed in claim 1, and spring means to assist said element in opposing the forward movement of said weight.

3. In a motor vehicle power brake system having a booster with a differential pressure operated motor mechanism and controlled by manually operated means, a source of fluid under pressure serving as a source of power for said motor mechanism, a differential fluid pressure operated reaction device operatively connected to oppose said manually operated means, a follow-up valve operated by said manually operated means to control the power of said motor mechanism by directing fluid under pressure from said source to and from said motor mechanism, an auxiliary valve having fluid transmitting means to direct fluid under pressure to and from said reaction device to increase the differential fluid pressure acting on said reaction device or to release the latter pressure to a level equal to but not below the differential pressure acting on said motor mechanism, a forwardly movable weight operatively connected to said auxiliary valve to operate said auxiliary valve to increase the force of said reaction device, and an element responsive to the differential fluid pressure acting on said reaction device to oppose said weight and to modulate the action of the latter, whereby the differential pressure acting on said reaction device is approximately proportional to the deceleration of said vehicle.

4. The construction as claimed in claim 3, a spring arranged to oppose the forward movement of said weight so that said weight comes into operation only after a predetermined proportion between the manual force on said manually operated means and the reaction force of said reaction device is exceeded, and a check valve arranged to permit the flow of fluid between said motor mechanism and said reaction device in a direction to never let said reaction device have a fluid pressure differential lower than that of said motor mechanism.

5. The construction as claimed in claim 3, and means to prevent undesired oscillation of said weight.

6. The construction as claimed in claim 3, where said motor mechanism comprises a movable piston, said auxiliary valve, said reaction device, and said element responsive to the differential fluid pressure being located in said piston, and said weight being pivotally suspended from said piston.

7. The construction as claimed in claim 6, and resilient means to bias said auxiliary valve into a position where the differential pressure acting on said reaction device is not increased over the differential pressure acting on said piston.

8. In a motor vehicle power brake system having a booster with a fluid pressure operated motor mechanism, a brake pedal operated by the operator, a source of fluid under pressure serving as a source of power for said motor mechanism, the latter comprising a housing, a piston movable within said housing to divide the space within said housing into a variable pressure chamber and a constant low pressure chamber, follow-up valve means carried by said piston and operatively connected to said brake pedal to be operated by the latter to direct fluid under pressure from said source to said variable pressure chamber in response to depression of said brake pedal and to release fluid from said variable pressure chamber in response to release of said brake pedal, a differential fluid pressure operated reaction device arranged in said piston to oppose the brake applying movement of said pedal, a spring acting on said reaction device in opposition to the differential pressure acting on said reaction device, said spring reacting against said brake pedal to serve as a return spring, and an abutment providing a solid connection to transmit the force between said brake pedal and said reaction device after said spring has yielded.

9. The construction as claimed in claim 8, an auxiliary valve carried by said piston to control the differential pressure acting on said reaction device, a weight pivotally suspended from said piston and operatively connected with said auxiliary valve to increase the differential pressure acting on said reaction device upon forward movement of said weight in response to an increased deceleration, said reaction device comprising a variable pressure chamber and a constant low pressure chamber in communication with said low pressure chamber of said motor mechanism, said auxiliary valve being connected to transmit fluid under pressure from said source of pressure to said variable pressure chamber of said reaction device when said weight moves forward in response to an increased deceleration, and an element responsive to the fluid pressure in said variable pressure chamber of said reaction device to oppose the forward movement of said weight.

References Cited in the file of this patent

UNITED STATES PATENTS

| | | |
|---|---|---|
| 1,978,667 | Breese | Oct. 30, 1934 |
| 2,055,253 | Gallup | Sept. 22, 1936 |
| 2,079,409 | Hunt | May 4, 1937 |
| 2,087,367 | Whittington | July 20, 1937 |
| 2,142,631 | Coyle | Jan. 3, 1939 |
| 2,375,750 | Campbell | May 15, 1945 |